United States Patent [19]
Hahn

[11] Patent Number: 5,684,689
[45] Date of Patent: Nov. 4, 1997

[54] INTERCHANGEABLE PLUG POWER SUPPLY WITH AUTOMATICALLY ADJUSTING INPUT VOLTAGE RECEIVING MECHANISM

[75] Inventor: Stan S. Hahn, Moraga, Calif.

[73] Assignee: Advanced Mobile Solutions, Inc., Moraga, Calif.

[21] Appl. No.: 670,247

[22] Filed: Jun. 19, 1996

[51] Int. Cl.⁶ .............................. H02M 1/00; H01R 29/06
[52] U.S. Cl. ........................................ 363/146; 439/172
[58] Field of Search .................................. 363/141, 143, 363/144, 146; 339/31 R, 36; 439/172

[56] References Cited

U.S. PATENT DOCUMENTS

| | | | |
|---|---|---|---|
| 1,485,193 | 2/1924 | McKay | 439/131 |
| 1,742,850 | 1/1930 | Douglas | 439/314 |
| 2,490,580 | 12/1949 | Colla, Jr. | 439/131 X |
| 2,538,296 | 1/1951 | Crocker | 439/131 X |
| 4,191,917 | 3/1980 | Brown et al. | 439/173 X |
| 4,518,212 | 5/1985 | Rumble | 439/221 X |
| 4,543,624 | 9/1985 | Rumble | 439/173 X |
| 4,626,052 | 12/1986 | Rumble | 439/173 |
| 4,743,829 | 5/1988 | Fenne et al. | 439/131 X |
| 4,911,649 | 3/1990 | Helmich, Jr. | 439/172 X |
| 4,973,827 | 11/1990 | Nozaki | 439/173 X |
| 4,985,806 | 1/1991 | Mazzullo et al. | 361/392 |
| 4,997,381 | 3/1991 | Oh | 439/131 X |
| 5,001,623 | 3/1991 | Magid | 363/143 |
| 5,159,545 | 10/1992 | Lee | 439/173 X |
| 5,212,836 | 5/1993 | Matsushita | |
| 5,213,516 | 5/1993 | Okamoto | 439/171 X |
| 5,423,690 | 6/1995 | Selker et al. | |

FOREIGN PATENT DOCUMENTS

7600749  8/1976  Netherlands ......................... 439/221

*Primary Examiner*—Peter S. Wong
*Assistant Examiner*—Rajnikant B. Patel
*Attorney, Agent, or Firm*—Adam H. Tachner; Crosby, Heafey, Roach & May

[57] ABSTRACT

A power supply with interchangeable plug capacity and interchangeable power input modules includes a casing, an electrical plug detachably mounted in the casing, allowing the user to accommodate various power source configurations and voltage supply levels without manually setting the unit for the available power source, resulting in increased user safety and convenience. Releasable locking mechanisms are included to engage the interchangeable electrical plug. The locking mechanisms can be released by a user to allow the plug to be moved to the detached position. A preferred form of electrical connection between a detachable plug and casing comprises a submerged conductor configuration to protect the user or passerby from electric shock. A variety of interchangeable electrical plugs can be fitted to the same casing for interface with a transformer in the power supply casing. Each such plug is internally wired to configure the primary windings of the transformer automatically to present a substantially constant AC voltage at the secondary windings of the transformer irrespective of the magnitude of the supply voltage standard.

14 Claims, 5 Drawing Sheets

INTERCHANGEABLE PLUG POWER SUPPLY WITH AUTOMATICALLY ADJUSTING INPUT VOLTAGE RECEIVING MECHANISM

BACKGROUND OF THE INVENTION

People rely heavily on a wide variety of electrical devices. Almost all of these devices draw power ultimately from a national standard source, usually delivered to the user through a wall outlet or socket. This leads to a challenge for the manufacturer of electrical devices destined for international use: while many electrical devices are sold for use throughout the world, there is no world standard for electrical plug configurations, size, shape, voltage or number of prongs. The wide variety of socket configurations in use worldwide burdens international suppliers of mobile products to varied countries and international travelers who wish to use electrical devices in a portable fashion. Moreover, different areas of the world use different voltage output standards. For example, in Europe and the U.K., the standard is 220 VAC, while in the U.S. the standard is 110 VAC.

Most industrial nations use a standardized alternating current supply with only two leads, a hot side and a neutral side. Some outlets specifically incorporate a separate earth or ground lead while others do not. A problem exists, therefore, with physically accessing an AC current source supplied through any number of outlet configurations and interfacing that current source with the appropriate input connections for a power supply or other electrical device.

The traditional solution for the mechanical prong configuration problem is to provide an adapter which includes a socket to accommodate the prongs of the electrical device integrated with a second set of prongs in a configuration for a local socket. These adapters have some serious flaws. One problem is that the adapters are bulky and at a minimum, cause the prongs of the original device to be extended by at least the length of the additional set of prongs. Since most plug devices are designed to be secured by spring tension and interaction with a wall plug, this can pose a significant mechanical disadvantage. The increased lever arm created by the additional prong length will tend to shift the plug downward, tending to pry the plug out of the wall socket. This will be true even for a light-weight plug.

The lever arm problem is accentuated with devices that are larger than a simple plug. Many power supplies and other electrical devices are designed to be wall-mounted at a wall socket. A typical power supply includes a casing which terminates in a plug designed to plug directly into the wall socket. The casing is often designed to lie against a wall to provide mechanical stability and to maintain the plug prongs in proper contact with the wall socket. If an adapter must be used, the unit loses the stability of resting against the wall and, because even a small amount of weight at the end of a lever arm will create a torque which will tend to pry the prongs out of the Wall socket, such a plug adapter is generally unusable for such wall-mounted plug-in devices. Moreover, angling the plug severely can compromise the electrical connection to the point that the plug no longer is in electrical contact with source current. This type of angling may lead to partial separation from the wall socket and may expose the prongs of the plug in such a way that a person or animal might come into contact with live current, thereby causing bodily harm.

Another approach to accommodating multiple physical outlet configurations on a single device is to integrate an interchangeable plug apparatus into the device which allows for easy alteration of the device/outlet compatibility without compromising the device physical characteristics as outlined above. A number of improvements in the art of interchangeable plug design are disclosed in U.S. patent application Ser. Nos. 08/233,125, filed Apr. 26, 1994, 08/414,209, filed Mar. 30, 1995, and 29/044,048, filed Sep. 15, 1995, incorporated herein in their entireties by reference.

Both the adaptor and interchangeable plug approaches to solving the regional differences in outlet configuration fail to address the need to adjust the device electrical circuitry for compatibility with the output voltage associated with each particular source outlet configuration. Some power supply and electrical device manufacturers have addressed this issue by including an input supply adjustment switch on the device or power supply. However, failure to properly adjust such a switch before connecting to the outlet could damage the device, endanger the user and lead to a failure of the electrical circuit connected to the utilized outlet.

There is, therefore, a need in the art for a plug apparatus compatible with various known physical outlet configurations which avoids potential voltage compatibility problems associated with internationally varying output voltage levels.

SUMMARY OF THE INVENTION

The present invention overcomes these and other problems by providing an interchangeable plug power supply device which accommodates most internationally known physical and electrical configurations for supply power and does not require the user to know the source voltage or adjust the device for such voltage level, but is rather automatically set to the proper voltage level for each physical outlet configuration when the appropriate plug unit is attached to the device. Moreover, the inventive device provides a safe means for drawing current from an interchangeable plug while minimizing a passerby's or user's risk of exposure to a live prong or connector.

To these ends, the present invention comprises an interchangeable plug power supply including a casing, an electrical plug detachably mounted in the casing and movable between a detached and an engaged, operative position, and a releasable locking means mechanically connected to the casing and designed to engage the electrical plug to maintain the plug in an operative position. The locking means can be released by a user to allow the plug to be moved to the detached position. Differently configured outlets electrically communicate in a distinct fashion with selected electrical contacts integral with the casing and connected to various transformer leads internal to the casing, thereby allowing for automatic accommodation of the input voltage received from the outlet.

A preferred form of locking mechanism is a depressible lock bar which is designed to engage a detent in the plug. The depressible lock bar is connected to or integral with the casing.

A preferred form of electrical connection between the combined battery charger and power supply and the electricity source is a plurality of submerged conductors protect the user against exposure to live current if an interchangeable plug-or cord becomes disconnected from a device while the plug or cord is secured to a live electrical socket.

OBJECTS OF THE INVENTION

It is therefore a principal object of the present invention to provide an AC universal power conversion apparatus wherein a DC power supply is provided with a plurality of connection plug modules each having a pin configuration suitable for compatible connection to a selected AC line having a unique standard voltage and pin geometry.

It is another object of the invention to provide an AC universal power conversion apparatus wherein a DC power supply is provided with a plurality of connection plug modules each having a wiring pattern for automatically configuring a transformer in the power supply for converting an available AC voltage to a selected AC voltage for proper operation of the power supply.

Another object of this invention is to provide a plurality of interchangeable plug devices designed to connect to or integrate with a compatible carrier which can be mechanically and electrically connected to an electrical device.

A further object of this invention is to provide a means for securing and electrically connecting an interchangeable plug with a compatible carrier in a manner which provides optimal user safety.

BRIEF DESCRIPTION OF THE DRAWINGS

The aforementioned advantages of the invention, as well as additional advantages thereof, will be more fully understood as a result of a detailed description of the preferred embodiment when taken in conjunction with the accompanying drawings in which:

FIG. 1, comprising

FIG. 3, comprising

FIG. 5, comprising

FIG. 6, comprising

FIG. 7, comprising

DETAILED DESCRIPTION OF A PREFERRED EMBODIMENT

A preferred embodiment of the present invention includes a casing, a plug mounted to the casing, a locking device to secure the mounted plug, and a plurality of electrical contacts and receptacles for electrical communication between modular electrical inputs designed for a variety of electrical sources. The specific shape of the casing can be modified in many ways to accommodate specific design needs. The plug can also be modified to accommodate specific design needs, including the number and configuration of electrical prongs to adapt to a variety of standard, electrical outlets. The drawings illustrate a representative device, but one skilled in the art will recognize that a variety of devices can be designed and manufactured which are encompassed by the teachings of this invention.

Figure 1A:
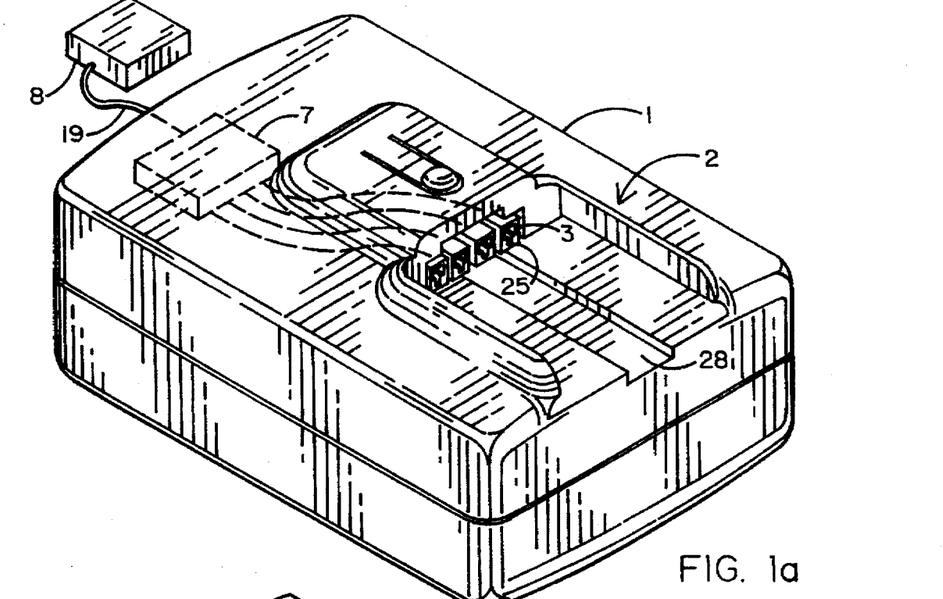
FIGS. 1A, 1B, 1C, 1D and 1E, illustrates perspective views of illustrative interchangeable plugs of the present invention and showing several interchangeable plugs usable in the inventive power supply device.
Figure 1B:
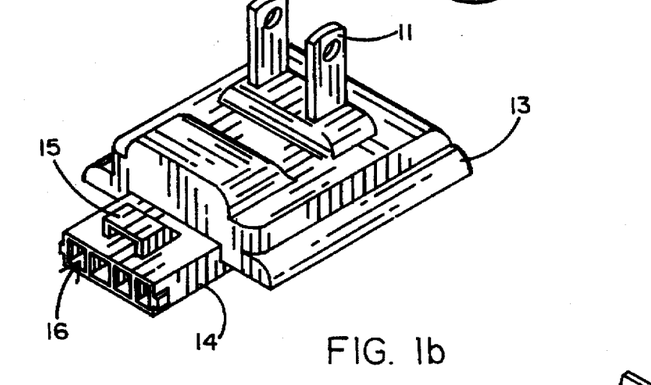
Figure 1C:
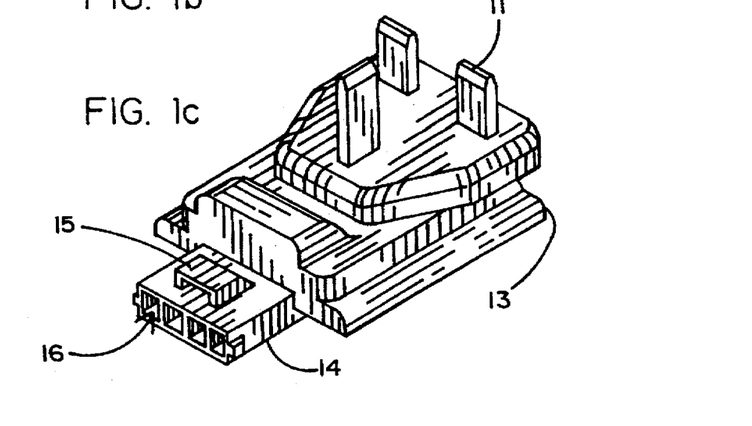
Figures 1D, 1E:
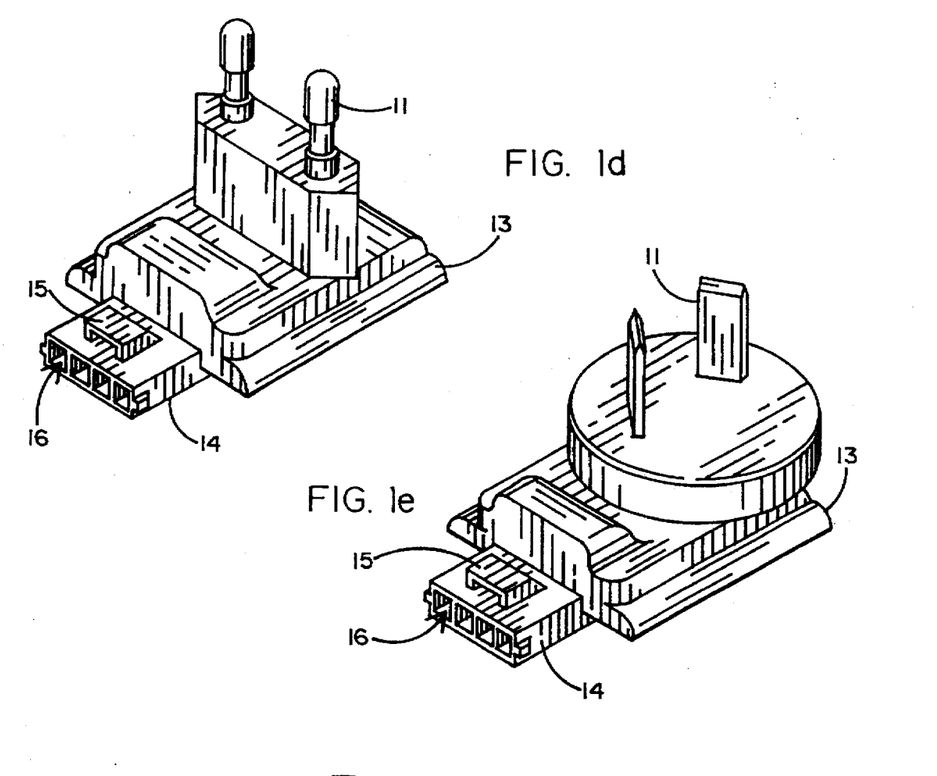

Referring to FIGS. 1A, 1B, 1C, 1D and 1E, casing 1 includes cavity 2 with channel 28 which is designed to accommodate any one of the plugs 13 depicted in the figures with tongue 14. FIG. 1B illustrates a plug designed for the United Kingdom, FIG. 1C for the United States, FIG. 1D for Europe and. FIG. 1E for Australia. Plug characteristics for other countries such as South Korea, can easily be integrated into the present invention. Openings 3 with submerged conducting pins 25, are designed to accommodate conducting sleeves 16 (see FIGS. 1A–1D). In a preferred embodiment, casing I is preferably made of high impact thermoplastic material, with top and bottom halves which can be sealed together by ultrasonic bonding.

Figure 3A:
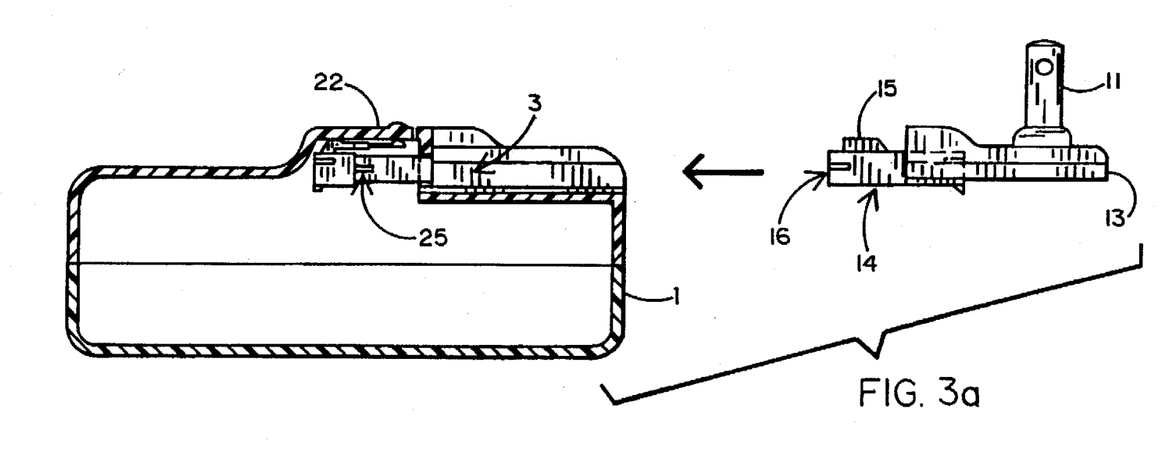
FIGS. 3A and 3B illustrates a cross-section of the device, showing a removable plug body and carrier ready to be connected to the device (FIG. 3A) and connected (FIG. 3B).

Referring to FIG. 3A, plug 13 is connected to or integral with prongs 11. Each prong 11 is electrically connected to a selected number of conducting sleeves 16 within plug 13. Sleeves 16 are designed to mate with corresponding conducting pins 25 positioned in cavity 3.

In one embodiment, shown in FIG. 1A, power supply 7, preferably a linear power supply contained on a printed circuit board, receives input power from conducting pins 25. Power supply 7 selectively forwards DC power through electrical cable 19 to electronic device 8.

Figure 2:
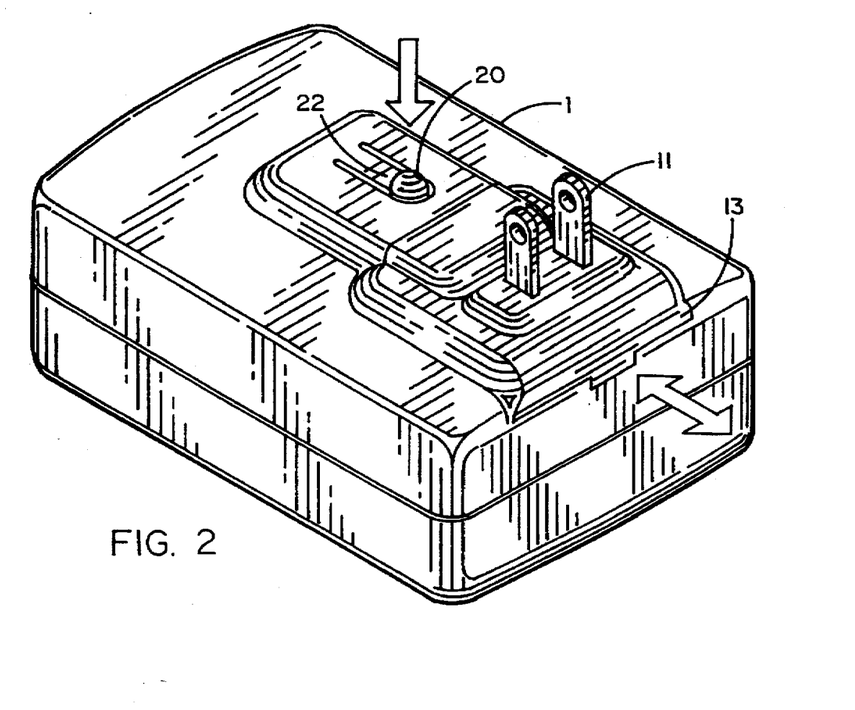
FIG. 2 illustrates a perspective view of the inventive power supply device, including an interchangeable plug with automatic voltage selection feature, showing a representative interchangeable plug in an operative position.
Figure 3B:
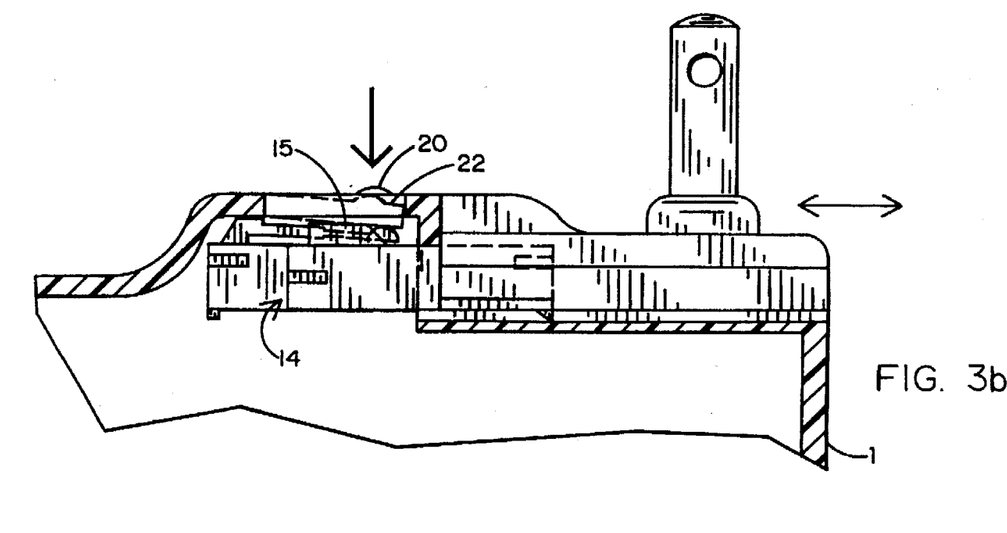

FIG. 2 provides an isometric profile and FIG. 3B illustrates a cutaway view of the interchangeable plug feature of a preferred embodiment of the inventive device in an operative position integrated with the casing. Casing 1 includes various features to support and position Various components of the device. Plug 13 is a generally rectangular element with a centered tongue 14. Detent 15, shown in greater detail in FIGS. 1A–1D, is integral with tongue 14.

FIGS. 3A and 3B show lock bar 22 deformably positioned within casing 1. Lock bar 22 is made of a suitable material, such as a plastic material, which is resilient, tends to return to a preferred position, and can be secured at one end and be bent repeatedly to perform the needed release function yet return to a resting position with enough tension to perform the needed latch function. Lock bar 22 is preferably formed integral with casing 1. Release button 20 is connected to or preferably integral with lock bar 22. Lock bar 22 is designed to engage detent 15. Detent 15 is shaped to accommodate the configuration of lock bar 22.

When a plug 13 and casing 1 are integrated into a singular unit, lock bar 22 is pressed against detent 15 by the natural tension and resilience of lock bar 22. To release the plug 13 from the casing 1, release button 20 is depressed, which moves lock bar 22 away from casing 1 and from detent 15. Plug 13 can then be disengaged from casing 1.

The pressure of lock bar 22 against detent 15 will maintain each plug 13 in the operative position until a user activates release button 20, moving it from a resting position to a released (depressed) position as shown in FIG. 3B. Once the release button is moved and lock bar 22 is removed from detent 15 at least far enough so that the plug 13 can slide freely, the user can move plug 13 away from casing 1. Although conducting sleeves 16 may remain hot electrical leads after plug 13 is removed, a user or passerby is protected from inadvertent contact with the conducting pins by their submerged position relative to the plug 13.

Figure 4:
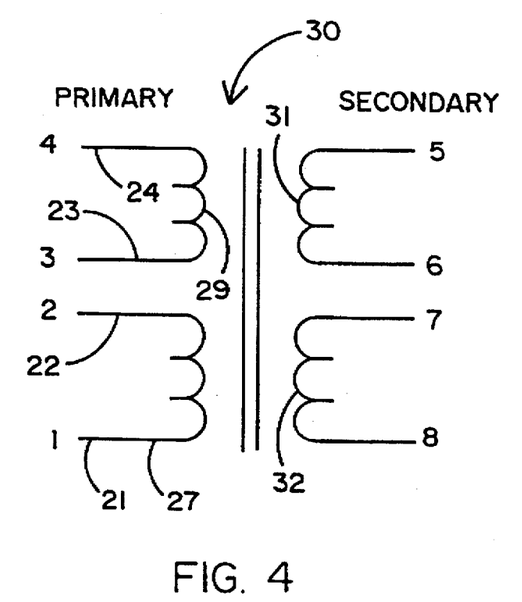
FIG. 4 is a schematic illustration of the transformer configuration utilized in the illustrated embodiment of the invention.

FIG. 4 illustrates a typical transformer configuration for use in the invention. The primary windings or coils 27 and 29 are connected to transformer leads 21, 22, 23 and 24 which are, in turn connected to electrical leads a, b, c, and d respectively of the corresponding plug 13 when a plug is installed. The voltage at secondary windings 31 and 32 depends on the ratio of turns of primary and secondary windings, respectively. If you double the number of turns in the primary winding by connecting coils 27 and 29 in series, the voltage at the secondary will be, for example, the same as that at the primary. However, if you don't double the number of primary turns, such as by connecting coils 27 and 29 in parallel instead of in series, the voltage at the secondary will be, for example, double that at the primary.

Figure 5A:
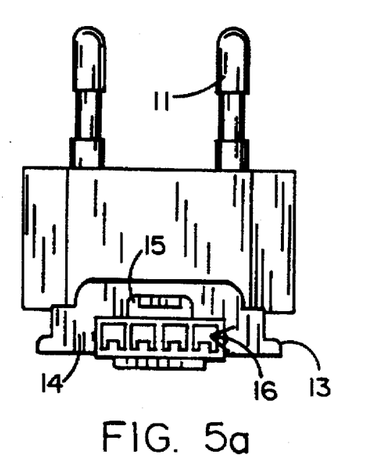
FIGS. 5A and 5B, illustrates in end and top schematic view, respectively, a connection plug module for connection of the invention to a standard outlet in the United Kingdom.
Figure 5B:
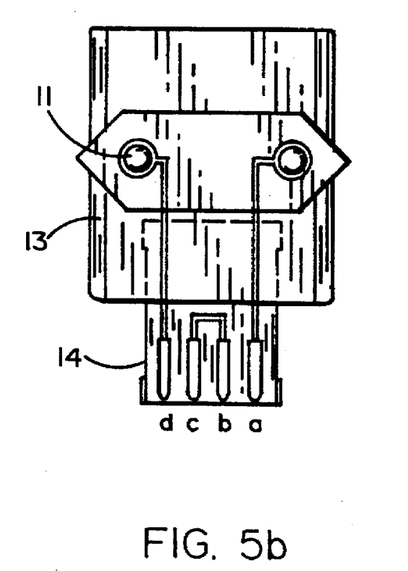
Figure 6A:
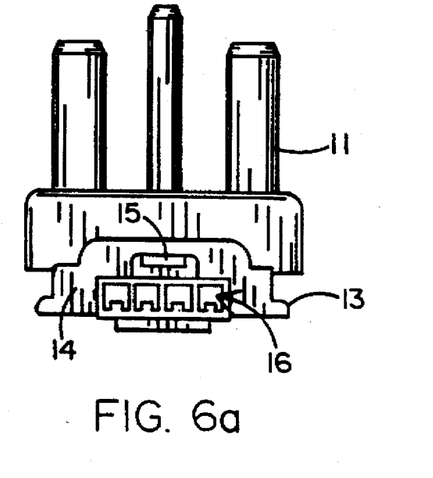
FIGS. 6A and 6B, illustrates in end and top schematic views, respectively, a connection plug module for connection of the invention to a standard outlet in other European countries.
Figure 6B:
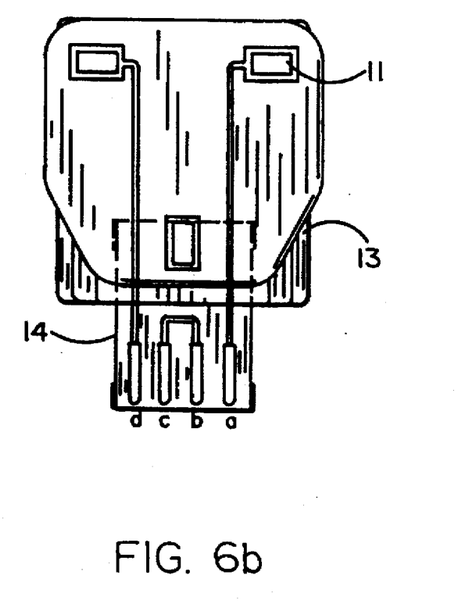
Figure 7A:
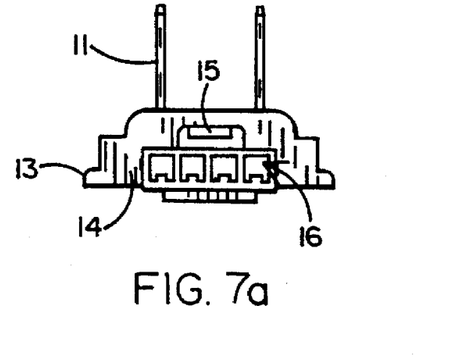
FIGS. 7A and 7B, illustrates in end and top schematic views, respectively, a connection plug module for connection of the invention to a standard outlet in the United States.
Figure 7B:
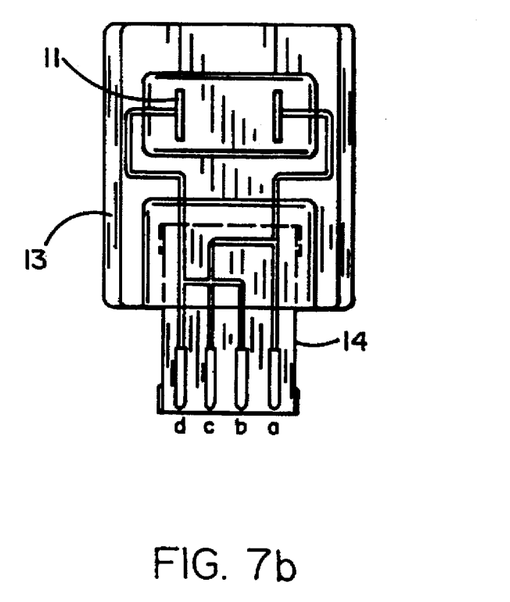

FIGS. 5B, 6B and 7B illustrate the inventive wiring arrangement which allows for automatic alignment of each interchangeable plug's input voltage with its compatible physical outlet structure. Three alternative wiring arrangements are provided, one for a two prong 220 VAC outlet found on the European continent, one for a three-prong, 220 VAC outlet found in the U.K. and the other for a two-prong, 110 VAC outlet found in the U.S. Turning for example to the U.K. compatible embodiment shown in FIG. 6B, electrical leads a, b, c and d, universal to all embodiments of the present invention, are designed for electrical communication with casing leads 25 shown in FIG. 1A. Casing leads 25 are connected to transformer leads 21, 22, 23 and 24, respectively. thus, any combination of transformer leads may be shorted together within interchangeable plug module wiring. In the module of FIG. 6B, leads b and c have been connected to apply the input voltage to all of the turns of the primary windings of transformer 30 in FIG. 4, thereby resulting in 220 volts across the secondary windings 31 and 32. In the module of FIG. 7B, leads a and c and leads b and d are shorted together, respectively, thereby applying 110 volts across one half the primary windings and again resulting in 220 volts across the secondary windings.

This doubling of the voltage in transformer 30 between primary and secondary coil windings is based on the ratio of turns, which in general, should be the inverse of the ratio of available outlet voltage to desired power supply input voltage. Other ratios, such as over a range of 1 to 3, can be readily accommodated by appropriate windings and plug wiring.

This invention further includes a securing means and a release mechanism integrated into the casing. The plug's prong layout can be modified to accommodate specific design needs, including the number and configuration of electrical prongs to adapt to a variety of standard electrical outlets. FIGS. 1–7 illustrate a representative device, but one skilled in the art will recognize that a variety of devices can be designed and manufactured which are encompassed by the teachings of this invention. A number of additional features of the interchangeable plug element of the present invention are disclosed in copending U.S. patent application Ser. Nos. 08/233,125, filed Apr. 26, 1994 and 08/414,209, filed Mar. 30, 1995, incorporated herein in their entireties by reference.

With this combination, the present invention provides an improved apparatus and method for deriving electrical current from an outlet meeting any national or international standard, forwarding electrical power to an electrical device or rechargeable battery or, significantly, both, all while providing the increased safety and convenience of an easily stored and transported device.

A general description of the device and method of using the present invention as well as a preferred embodiment of the present invention has been set forth above. One skilled in the art will recognize and be able to practice many changes in many aspects of the device and method described above, including variations which fall within the teachings of this invention. The spirit and scope of the invention should be limited only as set forth in the appended claims and their equivalents.

What is claimed is:

1. An AC to DC universal power conversion apparatus comprising:
   a plurality of power connection modules for use with an electrical device;
   each said module having a pin configuration suitable for compatible connection to a selected AC line having a different standard voltage;
   a transformer in said electrical device and having primary and secondary windings, the primary windings being connected to a plurality of connection terminals accessible at the electrical device;
   each said module having a like plurality of matching connection terminals for mating with said electrical device;
   each said module having selected fixed electrical paths for automatically
   configuring said primary windings without switching so that the voltage at said secondary windings is substantially the same irrespective of the different standard voltage of the selected AC line.

2. The power conversion apparatus recited in claim 1 wherein at least one of said modules comprises two pins and at least one of said modules comprises three pins.

3. The power conversion apparatus recited in claim 1 wherein at least one of said modules is configured for connection to a standard voltage of about 110 volts and at least one of said modules is configured for connection to a standard voltage of about 220 volts.

4. The power conversion apparatus recited in claim 1 wherein first and second modules of said plurality are configured to connect to respective standard voltages having a ratio of about two to one.

5. The power conversion apparatus recited in claim 4 wherein said first module is wired to configure said primary windings to have X turns and said second module is wired to configure said primary windings to have Y turns and wherein the ratio of X to Y is about one to two.

6. The power conversion apparatus recited in claim 1 wherein first and second modules of said plurality are configured to connect to respective standard voltages having a ration of R where R is in the range one to three.

7. The power conversion apparatus recited in claim 4 wherein said first module is wired to configure said primary windings to have X turns and said second module is wired to configure said primary windings to have Y turns and wherein the ration of X to Y is 1/R.

8. An electrical device configured for connection to any selected one of a plurality of different AC line sources, each said AC line source having a different standard voltage and a different pin geometry, the electrical device comprising:
   a plurality of separate power connection modules each having a pin configuration suitable for connection to a selected one of said AC line source;
   a transformer having primary and secondary windings, the primary windings being connected to a plurality of connection terminals accessible at an exterior surface of said electrical device;
   each said module having a like plurality of matching connection terminals for mating with said primary windings;

each said module having selected fixed electrical paths for automatically configuring said primary windings without switching so that the voltage at said secondary windings is substantially the same irrespective of the different standard voltage of the selected AC line source.

9. The electrical device recited in claim 8 wherein at least one of said modules comprises two pins and at least one of said modules comprises three pins.

10. The electrical device recited in claim 8 wherein at least one of said modules is configured for connection to a standard voltage of about 110 volts and at least one of said modules is configured for connection to a standard voltage of about 220 volts.

11. The electrical device recited in claim 8 wherein first and second modules of said plurality are configured to connect to respective standard voltages having a ration of about two to one.

12. The electrical device recited in claim 11 wherein said first module is wired to configure said primary windings to have X turns and said second module is wired to configure said primary windings to have Y turns and wherein the ratio of X to Y is about one to two.

13. The electrical device recited in claim 8 wherein first and second modules of said plurality are configured to connect to respective standard voltages having a ratio of R where R is in the range of 1 to 3.

14. The electrical device recited in claim 13 wherein said first module is wired to configure said primary windings to have X turns and said second module is wired to configure said primary windings to have Y turns and wherein the ratio of X to Y is 1/R.

* * * * *

UNITED STATES PATENT AND TRADEMARK OFFICE
CERTIFICATE OF CORRECTION

PATENT NO. : 5,684,689

DATED : November 4, 1997

INVENTOR(S) : Hahn

It is certified that error appears in the above-identified patent and that said Letters Patent is hereby corrected as shown below:

In column 2, line 5, after "filed Apr. 26, 1994," insert --now abandoned,--.

In column 2, line 6, after "30, 1995," insert --and issued June 3, 1997, as U.S. Pat. No. 5,634,806,-- and after "filed Sep. 15, 1995," insert --    issued July 22, 1997, as Des. 381,314,--.

In column 2, line 59, after "conductors" insert --which--.

In column 2, line 61, delete "plug-or" and insert therefor --plug or--.

In column 3, line 37, delete "3B" and insert therefor --3B,--.

In column 4, line 3, delete the comma after "standard".

In column 4, line 18, delete "casing I" and insert therefor --casing 1--.

In column 4, line 35, delete "Various" and insert therefor --various--.

In column 4, line 47, delete "to" and insert therefor --to,--.

In column 4, line 48, delete "with" and insert therefor --with,--.

In column 5, line 4, delete "turn" and insert therefor --turn,--.

UNITED STATES PATENT AND TRADEMARK OFFICE
CERTIFICATE OF CORRECTION

PATENT NO. : 5,684,689

DATED : November 4, 1997

INVENTOR(S) : Hahn

It is certified that error appears in the above-identified patent and that said Letters Patent is hereby corrected as shown below:

In column 5, line 5, delete "d respectively" and insert therefor --d, respectively,--.

In column 5, line 28, delete "thus," and insert therefor --Thus,--.

In column 5, line 56, after "filed Apr. 26, 1994" insert --, now abandoned,--.

In column 5, line 57, after "Mar. 30, 1995," insert --and issued June 3, 1997, as U.S. Pat. No. 5,634,806,--.

In column 7, line 17, delete "ration" and insert therefor --ratio--.

Signed and Sealed this

Twenty-eighth Day of April, 1998

*Attest:*

BRUCE LEHMAN

*Attesting Officer*       *Commissioner of Patents and Trademarks*